(12) United States Patent
Sha et al.

(10) Patent No.: US 9,683,453 B2
(45) Date of Patent: Jun. 20, 2017

(54) TURBINE CASING CLEARANCE MANAGEMENT SYSTEM

(71) Applicant: General Electric Company, Schenectady, NY (US)

(72) Inventors: Karimulla Shaik Sha, Pradesh (IN); Prakash Rajagopal, Karnataka (IN); Xiaoqing Zheng, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 905 days.

(21) Appl. No.: 14/023,582

(22) Filed: Sep. 11, 2013

(65) Prior Publication Data

US 2015/0071766 A1 Mar. 12, 2015

(51) Int. Cl.
*F01D 11/22* (2006.01)
(52) U.S. Cl.
CPC .......... *F01D 11/22* (2013.01); *F05D 2220/31* (2013.01); *Y02E 20/16* (2013.01)
(58) Field of Classification Search
CPC .......... F01D 11/20; F01D 11/22; F01D 25/26; F01D 25/28; F01D 3/02
See application file for complete search history.

(56) References Cited

U.S. PATENT DOCUMENTS

| 4,343,592 | A | * | 8/1982 | May | F01D 11/22 |
| | | | | | 415/127 |
| 4,557,664 | A | * | 12/1985 | Tuttle | F01D 3/04 |
| | | | | | 384/273 |
| 5,051,061 | A | | 9/1991 | Meylan | |
| 5,056,986 | A | | 10/1991 | Silvestri, Jr. et al. | |
| 6,092,986 | A | | 7/2000 | Oeynhausen et al. | |
| 6,988,869 | B2 | | 1/2006 | Haje | |
| 7,079,957 | B2 | * | 7/2006 | Finnigan | F01D 11/025 |
| | | | | | 415/173.2 |
| 2008/0063513 | A1 | * | 3/2008 | Afanasiev | F01D 11/22 |
| | | | | | 415/138 |
| 2010/0232942 | A1 | * | 9/2010 | Bock | F01D 11/22 |
| | | | | | 415/173.2 |
| 2011/0076137 | A1 | * | 3/2011 | Bolgar | F01D 11/22 |
| | | | | | 415/134 |

\* cited by examiner

*Primary Examiner* — Craig Kim
*Assistant Examiner* — Michael Sehn
(74) *Attorney, Agent, or Firm* — Hoffman Warnick LLC; Ernest G. Cusick

(57) ABSTRACT

Systems and devices configured to reduce thermal design clearances (e.g., between stationary nozzles connected to the inner casing and rotor buckets connected to the rotor) in turbines by actively controlling casing movements and/or locations during turbine operation are disclosed. In one embodiment, a clearance management system includes: a first inner casing support arm shaped to connect to an inner casing of a turbine and extend through an outer casing of the turbine; a seal system disposed about the first inner casing support arm and configured to connect to the outer casing; and a set of actuators disposed on a turbine foundation of the turbine and connected to the first inner casing support arm, the set of actuators located external to the outer casing and configured to adjust a position of the inner casing relative to the outer casing via manipulation of the first inner casing support arm.

18 Claims, 10 Drawing Sheets

TURBINE CASING CLEARANCE MANAGEMENT SYSTEM

BACKGROUND OF THE INVENTION

The subject matter disclosed herein relates to turbines and, more particularly, to systems and devices for providing and improving active clearance management of turbine casings and clearances (e.g., between stationary nozzles and rotor buckets, etc.) there between during turbine operation (e.g., start-up, shut-down, etc.).

Some power plant systems, for example certain nuclear, simple cycle and combined cycle power plant systems, employ turbines in their design and operation. Some of these turbines are driven by a flow of high temperature working fluid (e.g., steam, gas, etc.) which is directed over and/or through a series of stages and components (e.g., alternating stationary and rotary airfoils/buckets/blades) within a set of casings to generate power. These casings and components may be located at close proximity (e.g., small clearances) relative to one another so as to decrease working fluid leakage through the system and improve turbine efficiency. As a result of the high temperatures of this steam during operation, the casings and components (e.g., blades, shells, rotors, etc.) experience a significant increase in temperature, often rising across a temperature range of hundreds of degrees Fahrenheit. This temperature increase may cause the components of the turbine to expand and/or contract during the various operational phases of the turbine. Casing and component expansion rates may vary depending on location, size, orientation, shape, thermal symmetries, etc., and these variances in expansion may require that clearances between the casings and components be incorporated into the design to allow for these expansion variances and prevent rubbing of components and damage to the turbine during transient periods of operation (e.g., start-up, cool-down, etc.). These clearances may compensate for the inconsistent uniform bulk section temperatures in components, particularly stationary components such as the casings, which may cause these components to deflect relative to rotating components of the turbine. However, these increased clearances may limit turbine design and steady state operation, increasing section span due to large axial clearance, reducing turbine efficiency and/or power density due to both radial and axial clearance, and allowing leakage of steam past turbine components due to large radial clearance.

BRIEF DESCRIPTION OF THE INVENTION

A clearance management system including a first inner casing support arm shaped to connect to an inner casing of a turbine and extend through an outer casing of the turbine; a seal system disposed about the first inner casing support arm and configured to connect to the outer casing; and a set of actuators disposed on a turbine foundation of the turbine and connected to the first inner casing support arm, the set of actuators located external to the outer casing and configured to adjust a position of the inner casing relative to the outer casing via manipulation of the first inner casing support arm is disclosed.

A first aspect of the invention includes a clearance management system having: a first inner casing support arm shaped to connect to an inner casing of a turbine and extend through an outer casing of the turbine; a seal system disposed about the first inner casing support arm and configured to connect to the outer casing; and a set of actuators disposed on a turbine foundation of the turbine and connected to the first inner casing support arm, the set of actuators located external to the outer casing and configured to adjust a position of the inner casing relative to the outer casing via manipulation of the first inner casing support arm.

A second aspect of the invention includes a turbine having: an outer casing disposed on a turbine foundation; an inner casing disposed radially inboard of the outer casing, the inner casing including a set of inner casing support arms which extend through the outer casing and are disposed on a turbine foundation; a working fluid passage substantially surrounded by the outer casing and the inner casing; a rotor extending through the working fluid passage; and a clearance management system operably connected to the inner casing, the clearance management system including: a first inner casing support arm connected to the inner casing and extending through the outer casing; a seal system disposed about the first inner casing support arm and connected to the outer casing; and a set of actuators disposed on the turbine foundation and connected to the first inner casing support arm, the set of actuators located external to the outer casing and configured to adjust a position of the inner casing relative to the outer casing via manipulation of the first inner casing support arm.

A third aspect of the invention includes a turbine including: an outer casing disposed on a turbine foundation; an inner casing disposed radially inboard of the outer casing, the inner casing including a set of inner casing support arms which extend through the outer casing and are disposed on a turbine foundation; a working fluid passage substantially surrounded by the outer casing and the inner casing; a rotor extending through the working fluid passage, the rotor supported by journal bearings positioned on the turbine foundation; and a clearance management system operably connected to the inner casing, the clearance management system including: a first inner casing support arm connected to the inner casing and extending through the outer casing; a seal system disposed about the first inner casing support arm and connected to the outer casing; and a set of actuators disposed on the turbine foundation and connected to the first inner casing support arm, the set of actuators located external to the outer casing and configured to adjust a position of the inner casing to track axial motion of the rotor via manipulation of the first inner casing support arm.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
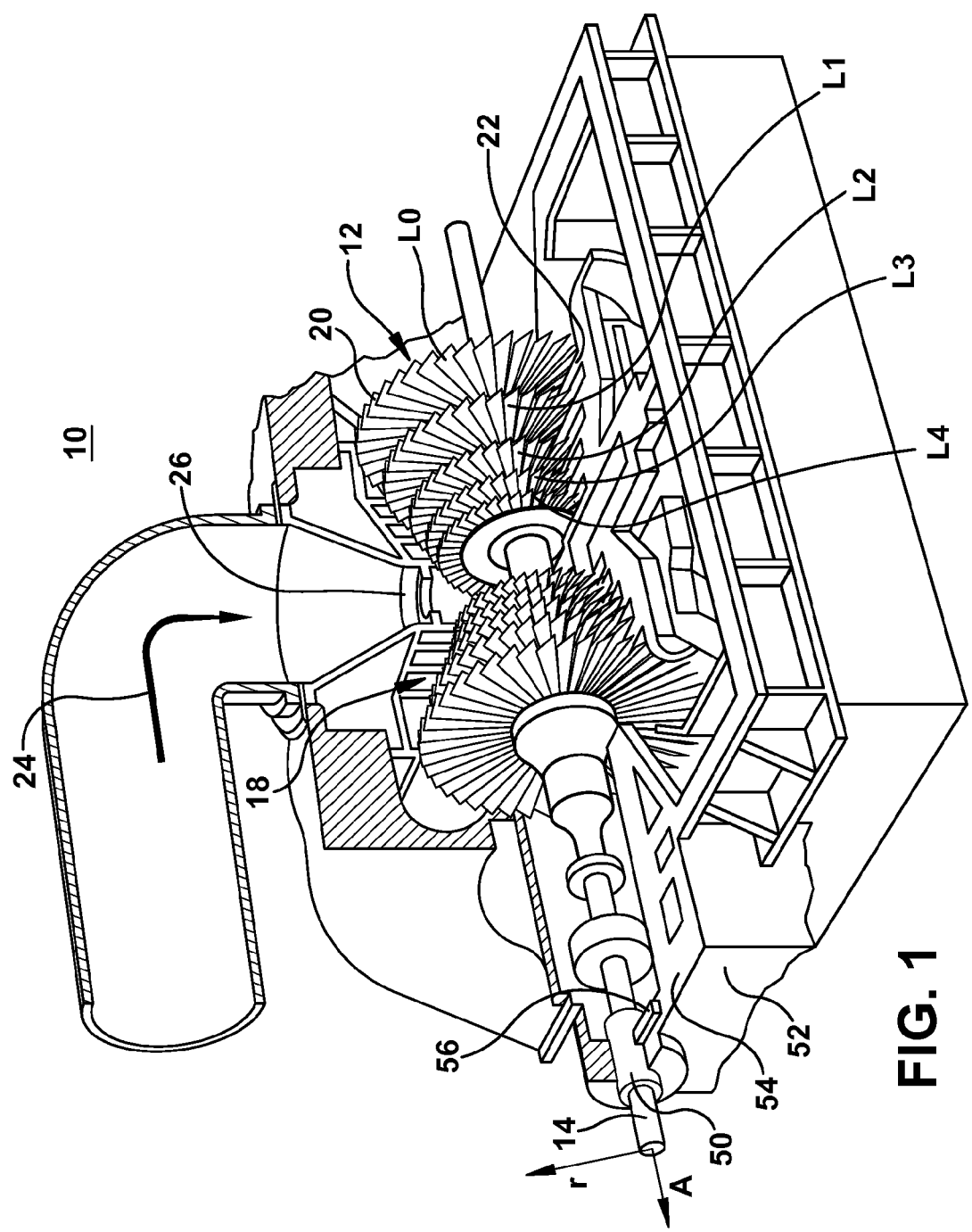
FIG. 1 a three-dimensional partial cut-away perspective view of a portion of a turbine according to an embodiment of the invention.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-10, like numbering may represent like elements. Redundant explanation of these elements has been omitted for clarity. Finally, it is understood that the components of FIGS. 1-10 and their accompanying descriptions may be applied to any embodiment described herein.

DETAILED DESCRIPTION OF THE INVENTION

As indicated above, aspects of the invention provide for clearance management systems and devices configured to reduce thermal design clearances (e.g., between stationary nozzles connected to the inner casing and rotor buckets connected to the rotor) in turbines by actively controlling casing movements and/or locations during turbine operation. The clearance management system includes a set of actuators including, but not limited to: Hydraulic, Piezoelectric, Electromagnetic, Artificial Muscle, Shape Memory Alloy (SMA) etc. The set of actuators are disposed external (e.g., on a turbine foundation) to an outer casing of a turbine and are connected to a set of inner casing support arms. The set of actuators are configured to adjust (e.g., axially move/locate) alignment and/or a position of the inner casing via manipulation of the set of inner casing support arms. The set of inner casing arms may be directly connected to the inner casing and may protrude through the outer casing via a set of thermal management seals. During operation of the turbine (e.g., transient operation) a technician and/or computing device may dynamically/gradually adjust a position of the inner casing relative to the outer casing so as to manipulate and/or maintain clearances (axial clearances) between the inner casing and rotating components as thermal expansion occurs, thereby reducing thermal expansion variances. As a result, the technician and/or computing device may control overall effective casing movements and clearances during start-up and shut-down processes and thereby reduce the required design clearances within the turbine (e.g., between the inner casing and the rotating components of the turbine).

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

Turning to the FIGURES, embodiments of systems and devices are shown, which are configured to reduce thermal design clearances in turbines by actively controlling casing movements and/or locations during turbine operation. Each of the components in the FIGURES may be connected via conventional means, e.g., via a common conduit or other known means as is indicated in FIGS. 1-10. Referring to the drawings, FIG. 1 shows a perspective partial cut-away illustration of a gas or steam turbine 10. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14, and the vanes are axially positioned between adjacent rows of blades 20. Stationary vanes 22 cooperate with blades 20 to form a stage and to define a portion of a flow path through turbine 10.

In operation, working fluid 24 (e.g., steam, gas) enters an inlet 26 of turbine 10 and is channeled through stationary vanes 22. Vanes 22 direct working fluid 24 against blades 20. Working fluid 24 passes through the remaining stages imparting a force on blades 20 causing shaft 14 to rotate. At least one end of turbine 10 may extend axially away from rotating shaft 14 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Shaft 14 of turbine 10 may be supported by a plurality of journal bearings 50 (one shown), which may allow shaft 14 to rotate freely within turbine 10. As shown in FIG. 1, journal bearings 50 may be positioned on a turbine foundation 52. More specifically, journal bearings 50 may be positioned on turbine foundation 52 and may be positioned in horizontal alignment with a horizontal support surface 54 of turbine foundation 52. Journal bearings 50 may also include protrusion 56 position on horizontal support surface 54 of turbine foundation 52. Protrusion 56 may reduce vertical growth mismatch between turbine 10 components due to turbine foundation 52 and/or support structure temperature variations the inner casing is also supported on the same height as the bearing support surface 54 or less than 10% height difference.

Figure 2:
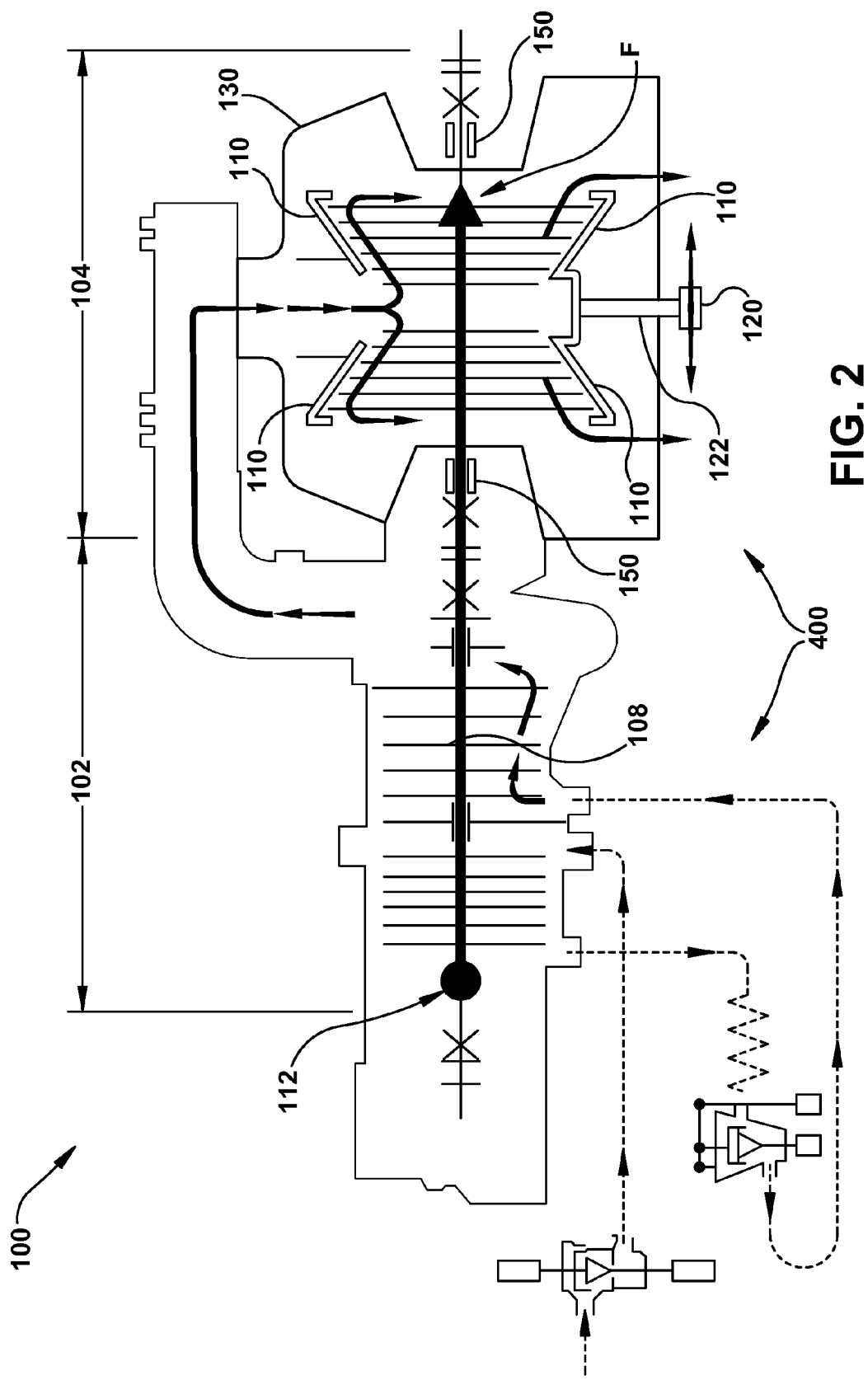
FIG. 2 shows a partial three-dimensional cut-away schematic view of a portion of a power generation system according to an embodiment of the invention.

Turning to FIG. 2, a schematic view of a power generation system 100 including an inner casing 110 disposed within an outer casing 130 and connected to a clearance management system 400 is shown according to embodiments of the invention. Turbine 100 may include a rotor 108 connected to a thrust bearing 112 and extending through a high and/or intermediate pressure (HP and/or IP) section 102 and a low pressure (LP) section 104 of turbine 100. Working fluid at varying temperatures may travel about rotor 108 proximate inner casing 110 and outer casing 130, causing thermal expansion of these components which may vary between stationary components and rotating component in sections 102 and 104. As seen in FIG. 2, rotor 108 will grow axially to the right starting at the thrust bearing 112 location, and over the length of section 102 and partial length of section 104 before reaches the LP section. Meanwhile, the casing is anchored locally, does not get an accumulated thermal expansion. Therefore, the rotating components in the LP section 104 would experience large axial thermal expansion and could rub into stationary components if the turbine is not designed sufficient axial clearance. To avoid large axial clearance, clearance management system 400 may include a set of actuators 120 operably connected to a set of inner casing arms 122 and configured to manipulate/actuate a position of inner casing 110 relative to outer casing 130 to track the movement of rotor 108.

Figure 3:
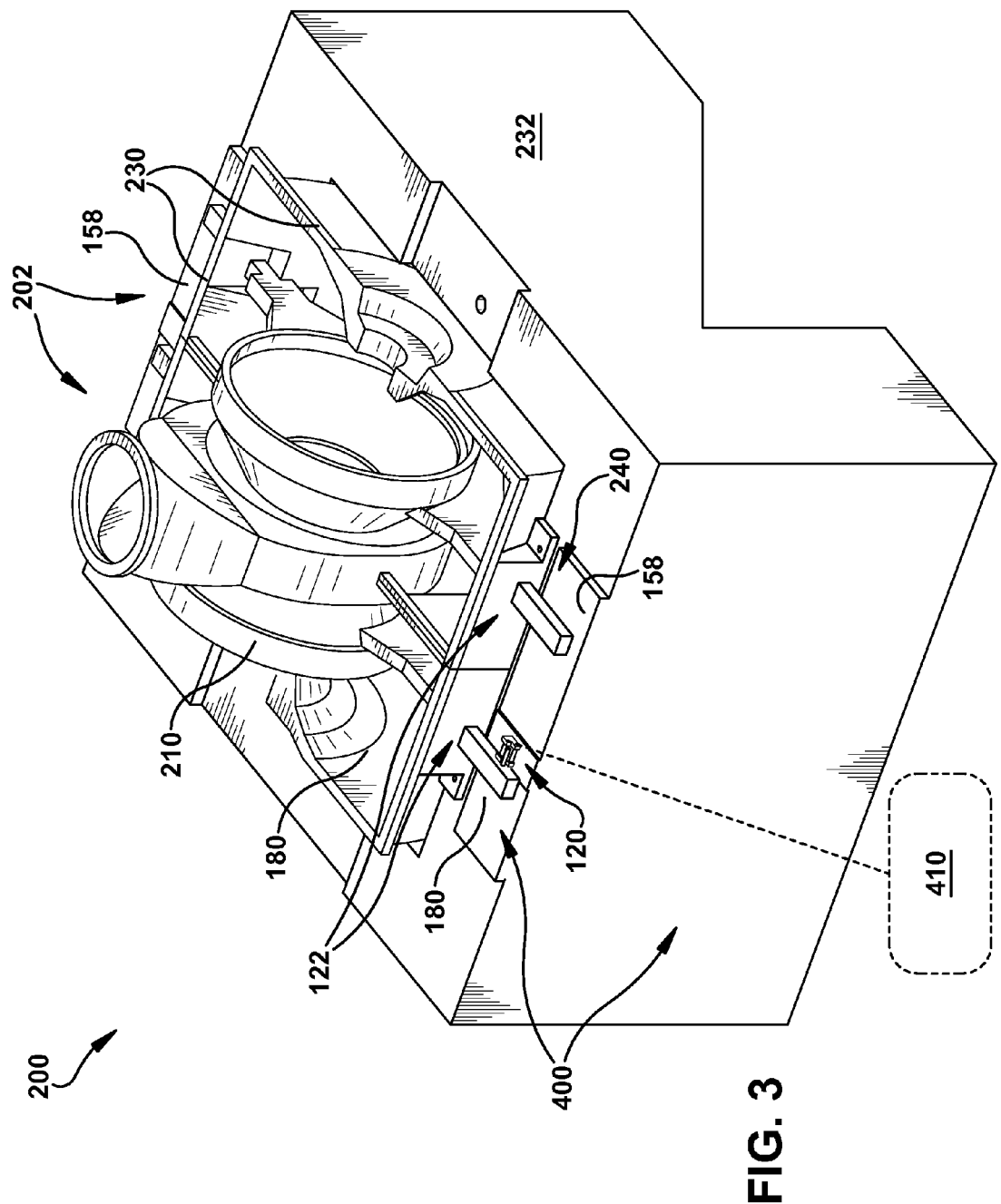
FIG. 3 shows a partial three-dimensional perspective view of a turbine according to an embodiment of the invention.

Turning to FIG. 3, a partial cross-sectional perspective view of a power generation system 200 including a clearance management system 400 connected to an inner casing 210 of a turbine 202 is shown according to embodiments of the invention. Inner casing 210 may be disposed within an outer casing 230 which is disposed on a turbine foundation 232. As can be seen in FIG. 3, clearance management system 400 may include a set of actuators 120 disposed on turbine foundation 232 and connected to inner casing 210 via a set of inner casing arms 122. In an embodiment, set of inner casing arms 122 may be directly connected to inner casing 210 and may extend through outer casing 230 via a set of thermal management seals 240 (shown in FIG. 7). Set of thermal management seals 240 may be configured to fluidly seal outer casing 230 about set of inner casing arms 122, allowing for movement of inner casing arms 122 relative to outer casing 230 while preventing fluid leakage out of and/or into outer casing 230. During operation of turbine 202, particularly during transient state operation of turbine 202, set of actuators 120 may manipulate a position of inner casing 210 relative to outer casing 230 via set of inner casing arms 122 so as to adjust for geometrical changes turbine components related to thermal expansion. In an embodiment, a technician and/or computing device may control set of actuators 120 and manipulate adjustments in accordance with operational parameters and/or conditions.

As can be seen in FIG. 3, a computing device 410 (shown in phantom) may be connected to clearance management system 400 and a set of operational sensors 180 may be disposed about turbine 202 and inner casing 210. Set of operational sensors 180 may monitor a position of inner casing 210, rather than a position of rotor 108 (FIG. 2), and/or a set of temperatures and conditions within turbine 202. As discussed herein, a technician and/or computing device 410 may control operation and adjustments of inner casing 210 by set of actuators 120 to regulate movement, displacement, expansion, and/or clearances between inner casing 210 and outer casing 230 and/or other components of turbine 202. In an embodiment, a technician may control computing device 410 and actively control clearances within turbine 202 via computing device 410 and clearance management system 400. During operation computing device 410 may process operational data obtained from operational sensors 180 and control clearance management system 400 based on the operational data. In one embodiment, computing device 410 may include a turbine model 432 (e.g., a predictive model/algorithm)(shown in FIG. 8) which may process the operational data to enable active clearance control of turbine 202 (e.g., inner casing 210) based on model predictions (e.g., anticipated expansion rates of casings and/or components based on operational values). Computing device 410 may actively control a position of inner casing 210 in substantially real-time via set of actuators 120, clearance management system 400, turbine model 432, and/or the operational data. In one embodiment, computing device 410 may be located remote relative to turbine 202 and/or set of actuators 120. In another embodiment, a technician may manually control adjustments of inner casing 210 based on operational data obtained from set of operational sensors 180. In one embodiment, the technician may monitor set of operational sensors 180 and manipulate operation of set of actuators 120 via computing device 410.

In an embodiment, computing device 410 may control axial and/or radial clearances within turbine 202 by relating clearance values to shell deflection values and controlling adjustments of vertical, lateral and/or axial position of inner casing 210 via set of actuators 120 in accordance with this correlation. In one embodiment, horizontal support surface 158 may have ramped portion to adjust vertical elevation of inner casing arms 122. More specifically, horizontal support surface 158 may be capable of vertically lifting an end closest to outer casing 230, such that horizontal support surface 158 and/or casing arms 122 may be angled in a direction away from rotor 108 (FIG. 2). Computing device 410 may manipulate inputs (e.g., forces) from set of actuators 120 based on a combination of clearance values and shell deflection values (e.g., as a clearance value is known to be varying via observation of operational data, computing device 410 and/or a technician may manipulate an input from set of actuators 120 to effect a comparable/desirable variation in shell deflection values for related components) to effect orientations/spacing (e.g., clearances) with other components. It is understood that the connection between any of operational sensors 180, computing device 410, set of actuators 120 and/or turbine 202 may be wireless, cabled, or any other means now known or later developed.

Figure 4:
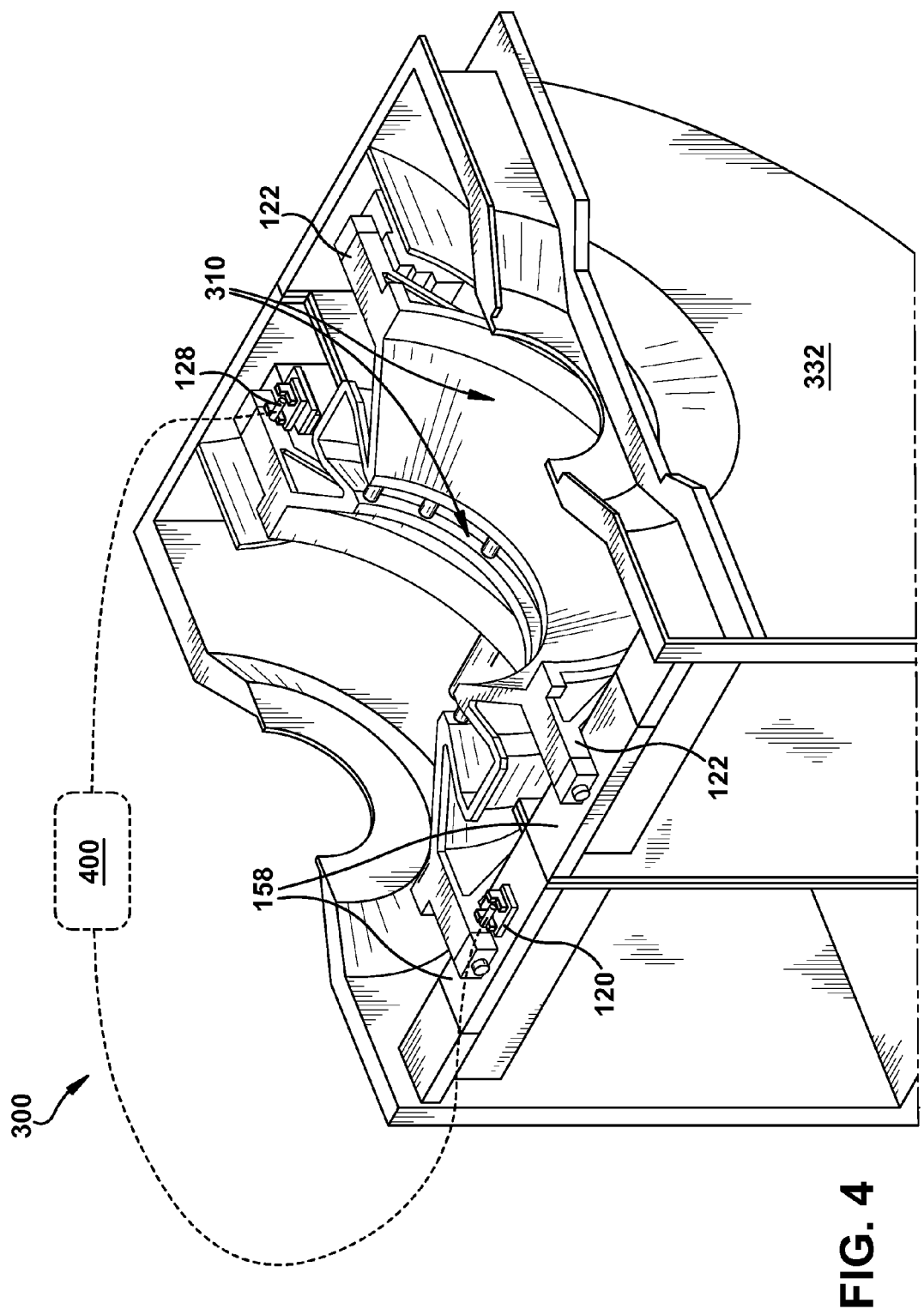
FIG. 4 shows a three-dimensional perspective view of a set of turbine casings according to an embodiment of the invention.
Figure 5:
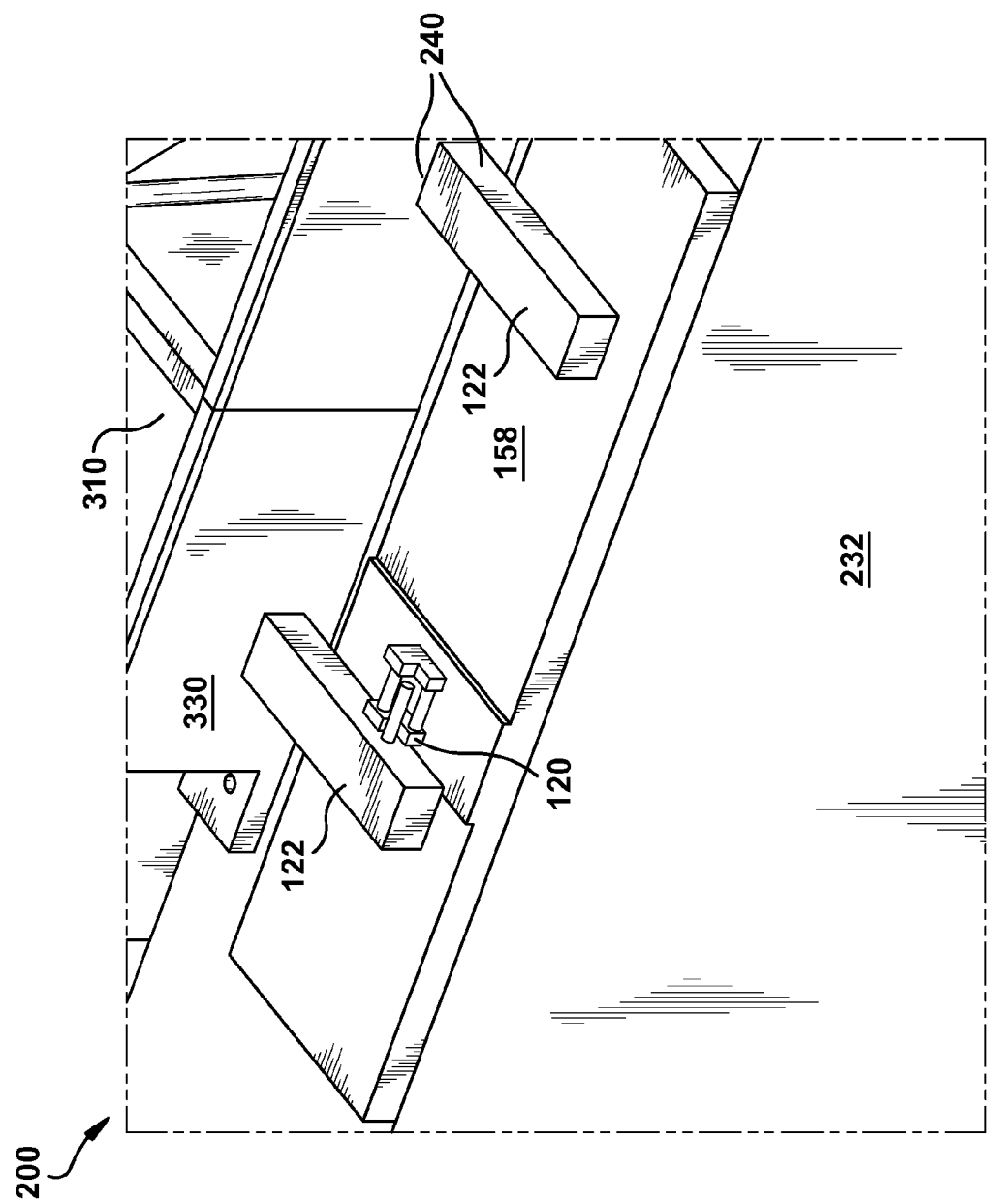
FIG. 5 shows a three-dimensional perspective view of a casing clearance management system according to an embodiment of the invention.

Turning to FIG. 4, a partial three-dimensional perspective view of an embodiment of a turbine 300 connected to a first actuator 120 and a second actuator 128 of a clearance management system 400 (e.g., a clearance control system) is shown. In this embodiment, clearance management system 400 includes first actuator 120 and second actuator 128 disposed on a turbine foundation 332 on substantially opposite sides of turbine 300. Actuators 120 and 128 may supply a force to inner casing arms 122 in order to manipulate a position of an inner casing 310 and/or clearances within turbine 300. In an embodiment, inner casing arms 122 may be disposed on a horizontal support surface 158 of turbine foundation 332 which is shaped and/or configured to include minimal friction. As can be seen in FIG. 5, inner casing arms 122 may extend through an outer casing 330 to connect inner casing 310 with an actuator 120 which is located external (e.g., radially outboard) to outer casing 330. In one embodiment, actuator 120 may include a threaded drive, a pneumatic and/or hydraulic piston, a solenoid, etc. It is understood that while the invention is described herein with certain numbers and/or orientations of actuators and inner casing arms, these descriptions are merely exemplary and that any number and/or configuration of actuators and/or casing arms now known or later developed may be used in accordance with embodiments of the invention.

Figure 6:
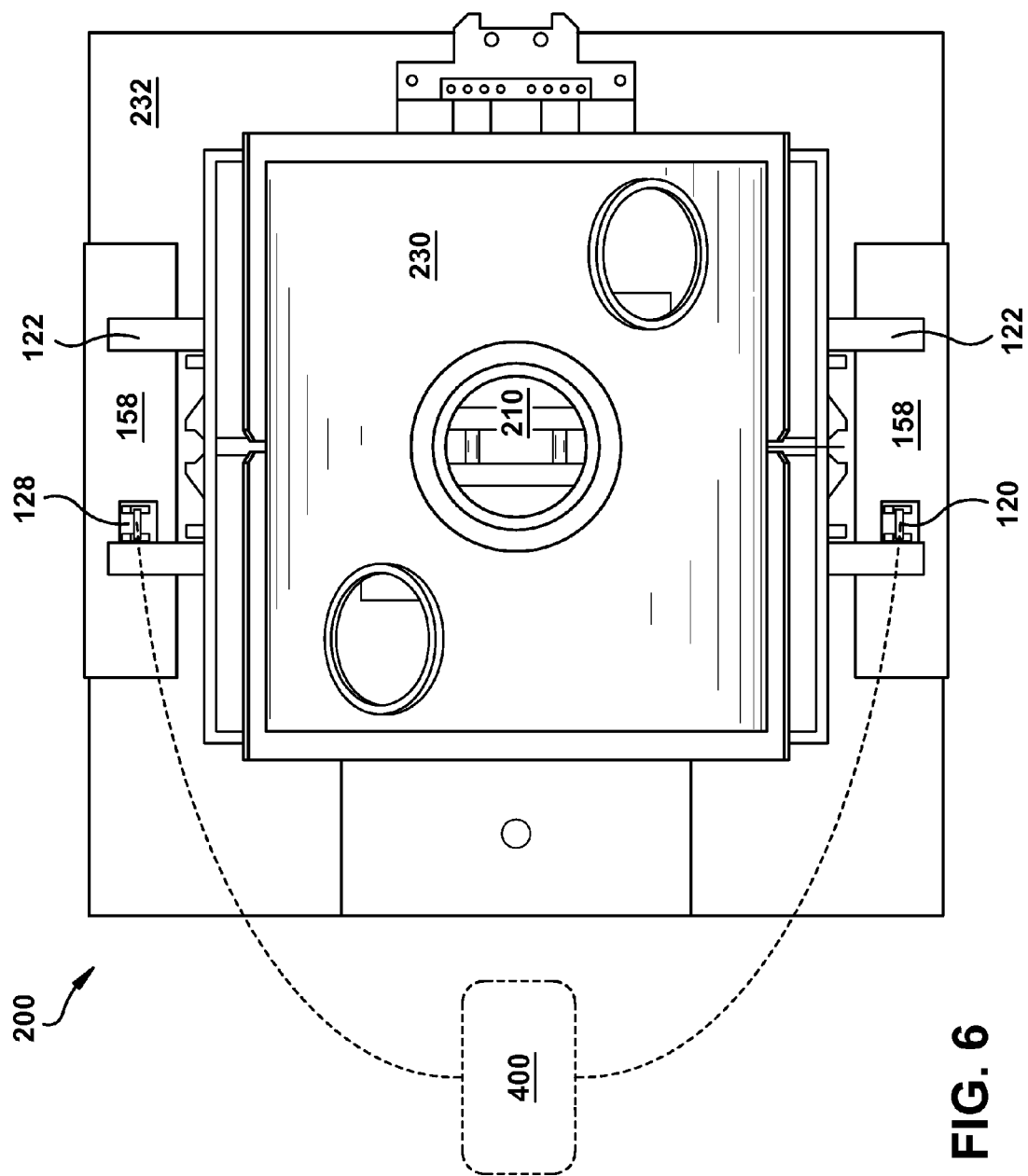
FIG. 6 shows a top view of a turbine casing according to an embodiment of the invention.

Turning to FIG. 6, a top view of an embodiment of clearance management system 400 (e.g., a clearance control system) disposed about turbine 200 is shown. In this embodiment, first actuator 120 and second actuator 128 are located axially parallel relative to one another and configured to uniformly move inner casing 210 in an axial direction relative to outer casing 230 and/or turbine foundation 232. In an embodiment, actuators 120 and 128 may be located about 180 degrees radially relative to one another and may impart comparable forces on inner casing arms 122 so as to limit any moments and/or non-uniform movements on inner casing 210. In one embodiment, actuators 120 and 128 may slide inner casing arms 122 across an entirety of horizontal support surface 158. [In another embodiment, horizontal surface 158 that provides vertical support to the inner shell is located inside of the outer casing 230, while the actuators 120 and 128 are placed outside of the outer casing so that they are not subjected to working fluid corrosion/erosion and can be easily accessed for maintenance.

Figure 7:
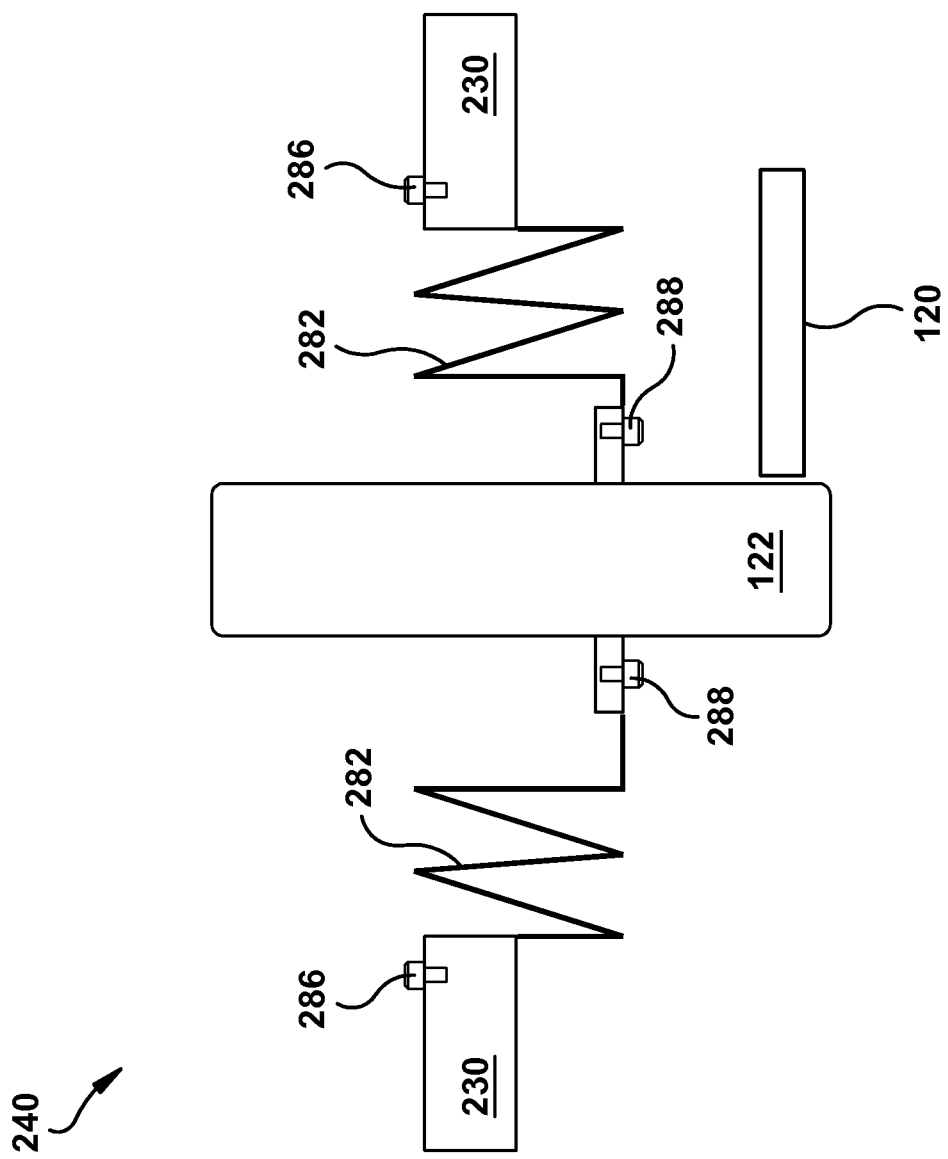
FIG. 7 shows a schematic view of a casing clearance management system and a casing seal according to an embodiment of the invention.

Turning to FIG. 7, a top view of a seal system 240 is shown according to embodiments. In this embodiment, seal system 240 includes a flexible seal 282 with an inner side enclosing inner casing arm 122 and an outer side connected to outer casing 230. As can be seen in FIG. 7, an actuator 120 may be connected to a portion of inner casing arm 122 which is external to outer casing 230 and may move inner casing arm 122 axially relative to outer casing 230. Flexible seals 282 may expand, contract and distort in accordance with movements of inner casing arm 122 so as to provide a continuous sealing between inner casing arm 122 and outer casing 230. Thereby, preventing the ingestion and/or exhaust of fluids from outer casing 230. In one embodiment, flexible seals 282 may be connected to a set of inner casing arm flanges 288 and/or outer casing 230 via a set of seal strips 286. In an alternative embodiment, not shown, flexible seals 282 may include round, axial type of bellow sealing components.

Figure 8:
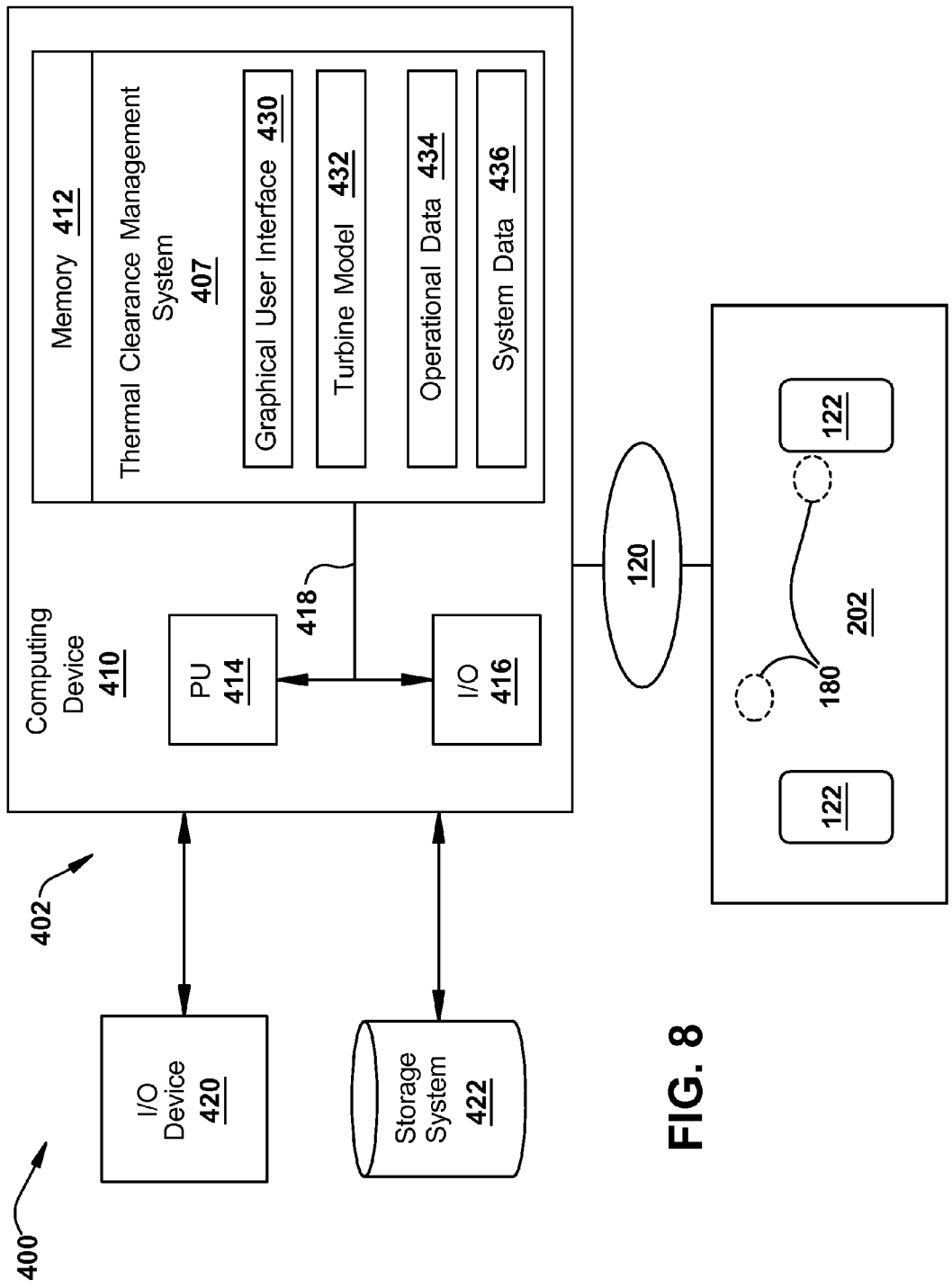
FIG. 8 shows a schematic illustration of an environment including a control system in accordance with an embodiment of the invention.

Turning to FIG. 8, a clearance management system 400 is shown including a set of actuators 120 connected to a computing device 410 and a turbine 202 according to embodiments of the invention. Clearance management system 400 includes a set of actuators 120 connected to turbine 202 via set of inner casing arms 122 and a computer infrastructure 402 that can perform the various processes described herein. In particular, computer infrastructure 402 is shown including computing device 410 which includes a thermal clearance management system 407, which enables computing device 410 to control, analyze, and/or predict conditions (e.g., clearances, displacements, temperatures, movements, etc.) of portions of turbine 202 (e.g., joints, casings, shells, surfaces, conduits, etc.) by performing the process steps of the disclosure. In one embodiment, computing device 410 may control/manage a clearance gap between components of turbine 202 and/or anticipate changes in the dimension of the clearance gap during turbine operation and/or temperature adjustments via set of actuators 120. Clearance management system 400 may be operated manually by a technician, automatically by computing device 410, and/or in conjunction with a technician and computing device 410.

As previously mentioned and discussed further below, thermal clearance management system 407 has the technical effect of enabling computing device 410 to perform, among other things, the clearance monitoring, adjustment and/or regulation described herein. It is understood that some of the various components shown in FIG. 8 can be implemented independently, combined, and/or stored in memory for one or more separate computing devices that are included in computing device 410. Further, it is understood that some of the components and/or functionality may not be implemented, or additional schemas and/or functionality may be included as part of thermal clearance management system 407.

Computing device 410 is shown including a memory 412, a processor unit (PU) 414, an input/output (I/O) interface 416, and a bus 418. Further, computing device 410 is shown in communication with an external I/O device/resource 420 and a storage system 422. As is known in the art, in general, PU 414 executes computer program code, such as thermal management system 407, that is stored in memory 412 and/or storage system 422. While executing computer program code, PU 414 can read and/or write data, such as graphical user interface 430 and/or operational data 432, to/from memory 412, storage system 422, and/or I/O interface 416. Bus 418 provides a communications link between each of the components in computing device 410. I/O device 420 can comprise any device that enables a user to interact with computing device 410 or any device that enables computing device 410 to communicate with one or more other computing devices. Input/output devices (including but not limited to keyboards, displays, pointing devices, etc.) can be coupled to the system either directly or through intervening I/O controllers.

In some embodiments, as shown in FIG. 8, clearance management system 400 may include set of operational sensors 180 (shown in phantom) connected to turbine 202 and communicatively connected to computing device 410 (e.g., via wireless or hard-wired means). Operational sensors 180 may obtain a set of operational data 432 (e.g., component temperatures, component displacements, working fluid temperatures, etc.) and transmit operational data 432 to computing device 410 for processing with thermal clearance management system 407 and/or a predictive turbine model 432 as a part of regulation/manipulation of set of actuators 120. In an embodiment, computing device 410 may control clearances (e.g., shell motion relative to rotor position due to shell deflections and thermal expansions, etc.) within turbine 202 by processing operational data 432 and adjusting inner casing 210 (shown in FIGS. 2-6) via of set of actuators 120 based in part on predictive turbine model 432. In one embodiment, operational sensors 180 may include proximity probes and thermocouples which may provide operational data 432 to computing device 410 as feedback for predictive turbine model 432 and/or thermal clearance management system 407.

In any event, computing device 410 can comprise any general purpose computing article of manufacture capable of executing computer program code installed by a user (e.g., a personal computer, server, handheld device, etc.). However, it is understood that computing device 410 is only representative of various possible equivalent computing devices and/or technicians that may perform the various process steps of the disclosure. To this extent, in other embodiments, computing device 410 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 410 may be/include a distributed control system.

Figure 9:
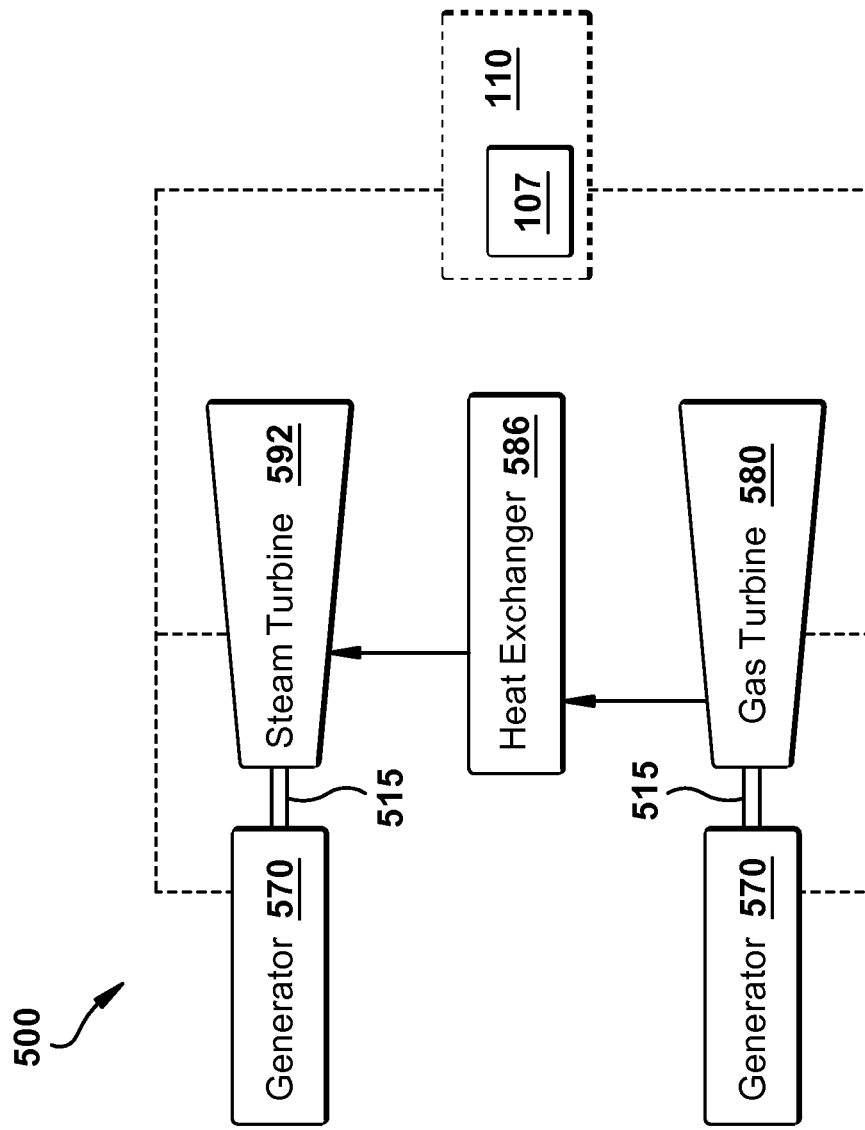
FIG. 9 shows a schematic block diagram illustrating portions of a combined cycle power plant system according to embodiments of the invention.
Figure 10:
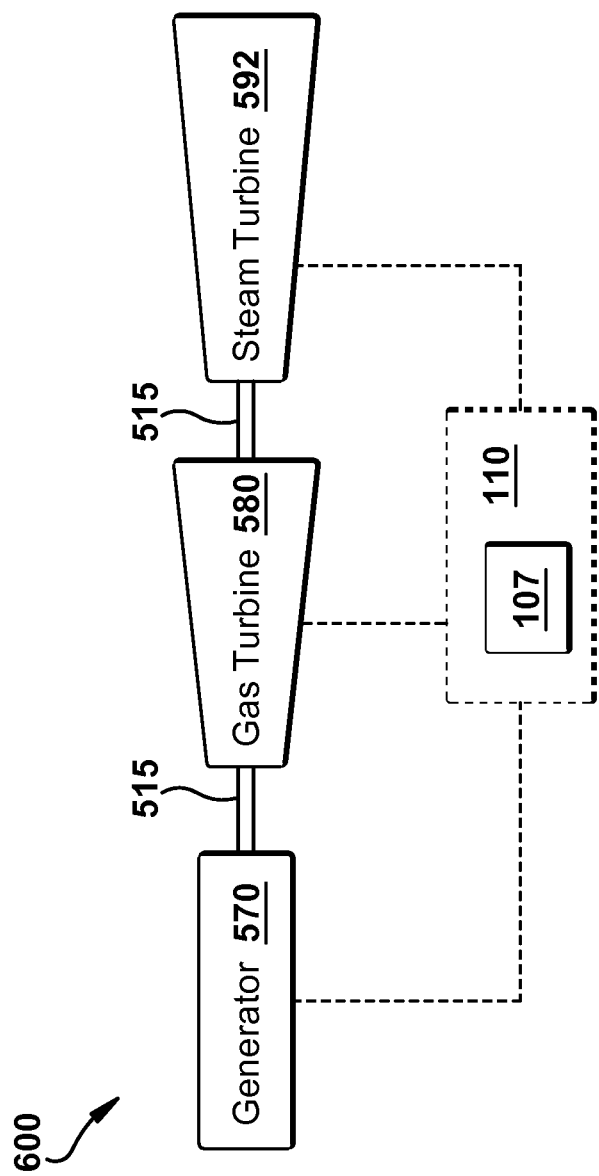
FIG. 10 shows a schematic block diagram illustrating portions of a single-shaft combined cycle power plant system according to embodiments of the invention.

Turning to FIG. 9, a schematic view of portions of a multi-shaft combined cycle power plant 500 is shown. Combined cycle power plant 500 may include, for example, a gas turbine 580 operably connected to a generator 570. Generator 570 and gas turbine 580 may be mechanically coupled by a shaft 515, which may transfer energy between a drive shaft (not shown) of gas turbine 580 and generator

570. Also shown in FIG. 9 is a heat exchanger 586 operably connected to gas turbine 580 and a steam turbine 592. Heat exchanger 586 may be fluidly connected to both gas turbine 580 and a steam turbine 592 via conventional conduits (numbering omitted). Gas turbine 580 and/or steam turbine 592 may include clearance management system 400 of FIG. 2 or other embodiments described herein. Heat exchanger 586 may be a conventional heat recovery steam generator (HRSG), such as those used in conventional combined cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). It is understood that generators 570 and shafts 515 may be of any size or type known in the art and may differ depending upon their application or the system to which they are connected. Common numbering of the generators and shafts is for clarity and does not necessarily suggest these generators or shafts are identical. In another embodiment, shown in FIG. 10, a single shaft combined cycle power plant 590 may include a single generator 570 coupled to both gas turbine 580 and steam turbine 592 via a single shaft 515. Steam turbine 592 and/or gas turbine 580 may include clearance management system 400 of FIG. 2 or other embodiments described herein.

The apparatus and devices of the present disclosure are not limited to any one particular turbine, generator, power generation system or other system, and may be used with other power generation systems and/or systems (e.g., combined cycle, simple cycle, nuclear reactor, etc.). Additionally, the apparatus of the present invention may be used with other systems not described herein that may benefit from the clearance control and increased efficiency of the apparatus and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A clearance management system comprising:
    a first inner casing support arm shaped to connect to an inner casing of a turbine and extend through an outer casing of the turbine;
    a seal system disposed about the first inner casing support arm and configured to connect to the outer casing;
    a set of actuators disposed on a ramped reference surface of a turbine foundation of the turbine and connected to the first inner casing support arm, the set of actuators located external to the outer casing and configured to adjust a position of the inner casing relative to the outer casing via manipulation of the first inner casing support arm, wherein movement of the set of actuators relative to the ramped reference surface adjusts an axial position of the inner casing relative to the outer casing, and a vertical elevation of the first inner casing support arm; and
    a computing device operably connected to the set of actuators, wherein the computing device adjusts an axial clearance between the inner and outer casings via the set of actuators based on thermal expansion of a turbine component.

2. The clearance management system of claim 1, wherein the computing device is further configured to manipulate clearances between components of the turbine by adjusting the position of the inner casing.

3. The clearance management system of claim 1, wherein the turbine foundation includes a first surface with a low coefficient of friction disposed beneath the first inner casing support arm.

4. The clearance management system of claim 1, further comprising a second inner casing support arm connected to the inner casing and extending through the outer casing, the second inner casing support arm disposed substantially radially opposite of the first inner casing support arm.

5. The clearance management system of claim 4, wherein each of the set of actuators is connected to the second inner casing support arm, and configured to further adjust the position of the inner casing via manipulation of the second inner casing support arm.

6. The clearance management system of claim 1, further comprising a set of operational sensors disposed about the turbine and configured to monitor operating conditions, and wherein the set of actuators are hydraulic.

7. The clearance management system of claim 1, wherein the seal system is a barrel seal.

8. The clearance management system of claim 1, wherein the turbine component comprises a rotor within the inner casing.

9. A turbine comprising:
    an outer casing disposed on a turbine foundation;
    an inner casing disposed radially inboard of the outer casing, the inner casing including a set of inner casing support arms which extend through the outer casing and are disposed on a turbine foundation;
    a working fluid passage substantially surrounded by the outer casing and the inner casing;
    a rotor extending through the working fluid passage; and
    a clearance management system operably connected to the inner casing, the clearance management system including:
        a first inner casing support arm connected to the inner casing and extending through the outer casing;
        a seal system disposed about the first inner casing support arm and connected to the outer casing;
        a set of actuators disposed on a ramped surface of the turbine foundation and connected to the first inner casing support arm, the set of actuators located external to the outer casing and configured to adjust a position of the inner casing relative to the outer casing via manipulation of the first inner casing support arm, wherein movement of the set of actuators relative to the ramped reference surface adjusts an axial position of the inner casing relative to the outer casing, and a vertical elevation of the first inner casing support arm; and a computing device operably connected to the set of actuators, wherein the computing device adjusts an axial clearance between the inner and outer casings via the set of actuators based on thermal expansion of the rotor.

10. The turbine of claim 9, wherein the computing device is further configured to manipulate clearances between components of the turbine by adjusting the position of the inner casing.

11. The turbine of claim 9, wherein the turbine foundation includes a first surface with a low coefficient of friction disposed beneath the first inner casing support arm.

12. The turbine of claim 9, wherein the clearance management system further comprises a second inner casing support arm connected to the inner casing and extending through the outer casing, the second inner casing support arm disposed substantially radially opposite of the first inner casing support arm.

13. The turbine of claim 12, wherein the each of the set of actuators is connected to the second inner casing support arm, and configured to further adjust the position of the inner casing via manipulation of the second inner casing support arm.

14. The turbine of claim 9, wherein the clearance management system further comprises a set of operational sensors disposed about the turbine and configured to monitor operating conditions, and wherein the set of actuators are hydraulic.

15. The turbine of claim 14, wherein the computing device is configured to calculate the thermal expansion of the rotor based on the operating conditions monitored with the set of operational sensors.

16. The turbine of claim 9, wherein the seal system of the clearance management system is a barrel seal.

17. A turbine comprising:
an outer casing disposed on a turbine foundation;
an inner casing disposed radially inboard of the outer casing, the inner casing including a set of inner casing support arms which extend through the outer casing and are disposed on a turbine foundation;
a working fluid passage substantially surrounded by the outer casing and the inner casing;
a rotor extending through the working fluid passage, the rotor supported by journal bearings positioned on the turbine foundation; and
a clearance management system operably connected to the inner casing, the clearance management system including:
  a first inner casing support arm connected to the inner casing and extending through the outer casing;
  a seal system disposed about the first inner casing support arm and connected to the outer casing;
  a set of actuators disposed on a ramped surface of the turbine foundation and connected to the first inner casing support arm, the set of actuators located external to the outer casing and configured to adjust a position of the inner casing to track axial motion of the rotor via manipulation of the first inner casing support arm, wherein movement of the set of actuators relative to the ramped reference surface adjusts an axial position of the inner casing relative to the outer casing, and a vertical elevation of the first inner casing support arm; and
  a computing device operably connected to the set of actuators, wherein the computing device adjusts an axial clearance between the inner and outer casings via the set of actuators based on thermal expansion of the rotor.

18. The turbine of claim 17, wherein the turbine foundation includes a horizontal support surface for the inner casing support arms, wherein the horizontal support surface is in horizontal alignment with the journal bearings positioned on the turbine foundation.

* * * * *